US012809720B2

(12) United States Patent
Erickson et al.

(10) Patent No.: US 12,809,720 B2
(45) Date of Patent: Nov. 24, 2026

(54) MEMORY DEVICE WITH CONFIGURABLE ADAPTIVE DOUBLE DEVICE DATA CORRECTION

(71) Applicant: Rambus Inc., San Jose, CA (US)

(72) Inventors: Evan Lawrence Erickson, Chapel Hill, NC (US); Taeksang Song, San Jose, CA (US); Thomas Vogelsang, Jericho, VT (US); John Eric Linstadt, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/906,326

(22) Filed: Oct. 4, 2024

(65) Prior Publication Data

US 2025/0130892 A1 Apr. 24, 2025

Related U.S. Application Data

(60) Provisional application No. 63/544,892, filed on Oct. 19, 2023.

(51) Int. Cl.
*G06F 11/00* (2006.01)
*G06F 11/10* (2006.01)

(52) U.S. Cl.
CPC ...... *G06F 11/1044* (2013.01); *G06F 11/1064* (2013.01)

(58) Field of Classification Search
CPC ............. G06F 11/1044; G06F 11/1064; G06F 11/0727; G06F 11/203
See application file for complete search history.

(56) References Cited

U.S. PATENT DOCUMENTS

2014/0229797 A1* 8/2014 Agrawal ............. G06F 11/1064 714/766
2016/0179702 A1* 6/2016 Chhabra ............. G06F 13/1605 713/193
2019/0006001 A1* 1/2019 Chun .................... G06F 11/073
2023/0022320 A1* 1/2023 Scrbak .................. G06F 12/121
2024/0061741 A1* 2/2024 Agarwal ............. G06F 11/1048
2024/0143527 A1* 5/2024 Marcovitch ............. G06F 13/28

* cited by examiner

*Primary Examiner* — Joseph D Manoskey
(74) *Attorney, Agent, or Firm* — Lowenstein Sandler LLP

(57) ABSTRACT

Technologies for configurable adaptive double device data correction (ADDDC) are described. A memory buffer device includes error detection and correction (EDC) logic to autonomously detect errors in a region of memory and, upon detection of an error, calculate additional ECC check symbols for cache lines in the region and store the additional ECC check symbols as metadata associated with the cache lines.

20 Claims, 8 Drawing Sheets

MEMORY DEVICE WITH CONFIGURABLE ADAPTIVE DOUBLE DEVICE DATA CORRECTION

RELATED APPLICATIONS

This application claims the benefit of U.S. Provisional Application No. 63/544,892, filed Oct. 19, 2023, the entire contents of which are incorporated herein by reference.

BACKGROUND

Modern computer systems generally include a data storage device, such as a memory component or device. The memory component may be, for example, a random-access memory (RAM) or a dynamic random-access memory (DRAM) device. The memory device includes memory banks made up of memory cells that a memory controller or memory client accesses through a command interface and a data interface within the memory device. The memory devices can be located on a memory module. The memory module can include one or more volatile memory devices. Some applications, such as safety-critical applications (e.g., aerospace, industrial control, automotive, and certain mission-critical computer systems), where system failures could have severe consequences, need operational configuration or redundancy mechanisms employed in various systems to enhance reliability and fault tolerance.

BRIEF DESCRIPTION OF THE DRAWINGS

The present disclosure is illustrated by way of example, and not by way of limitation, in the figures of the accompanying drawings.

DETAILED DESCRIPTION

Figure 1:
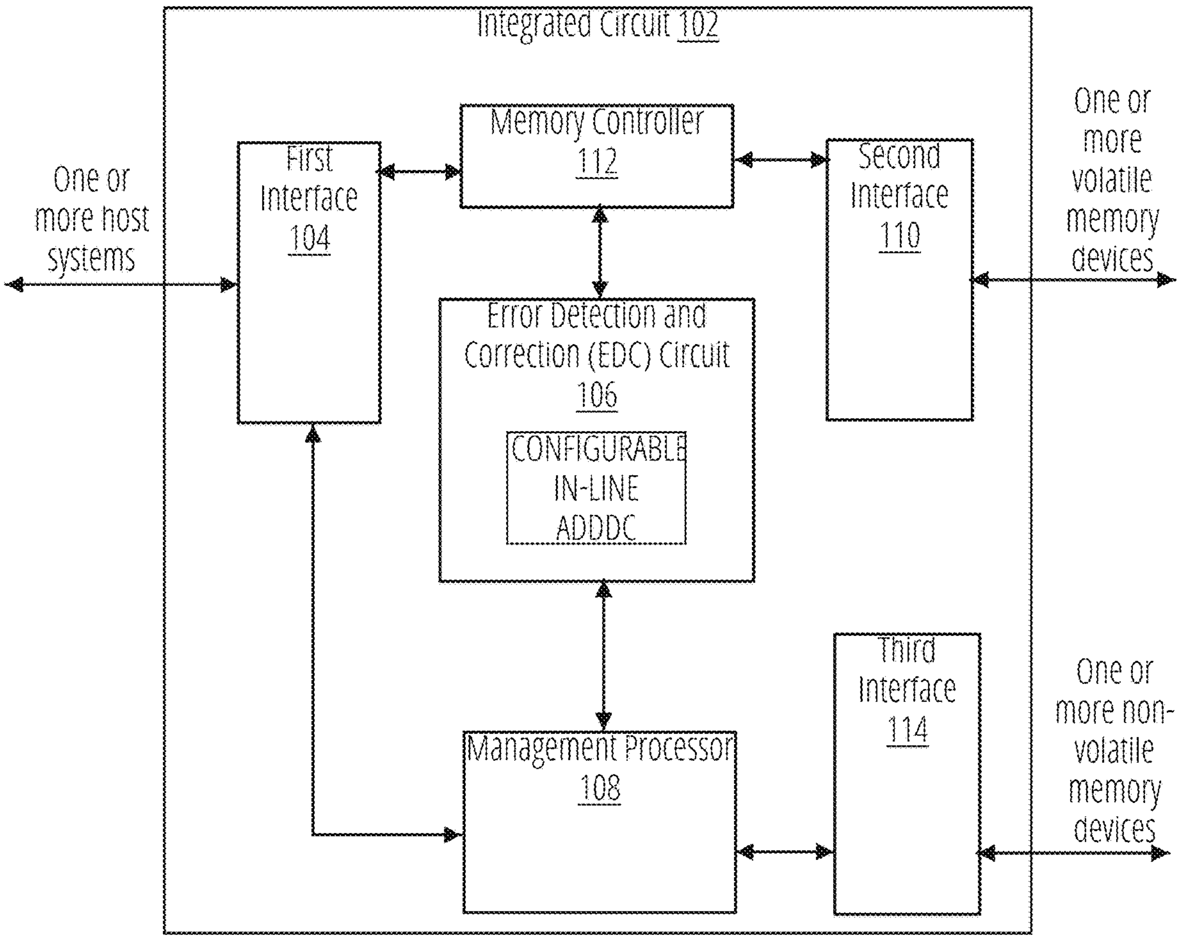
FIG. 1 is a block diagram of an integrated circuit with a memory controller, an encryption circuit, and a management processor according to at least one embodiment.

Technologies for configurable adaptive double device data correction (ADDDC) are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

In general, error detection and correction (EDC) information symbols, called "check symbols" (e.g., error correction codes or error correcting codes (ECCs)), can be used to detect and correct errors. The check symbols can be used to detect and correct errors when transferring data, such as when reading from memory or sending over a communication channel. The check symbols can also be used when a memory chip (also referred to as memory devices or memory integrated circuits (ICs)) is detected as faulty or corrupted. That is, an error in a memory chip can be caused by a fault or data corruption. A memory buffer device can have EDC logic (also referred to as ECC block, ECC circuitry, or ECC logic) that continuously monitors memory operations. When the EDC logic detects an error in one of the memory chips, it can recognize that the data stored in that chip is no longer reliable. The EDC logic can use additional parity bits (check symbols) that have been calculated and stored alongside the data on each memory chip. These parity bits provide a way to check the integrity of the data stored on that chip. During a memory error correction event (also referred to herein as an EDC event (e.g., if all data pins of a memory chip are corrupted as a Chipkill® event), the parity bits are checked against the stored data. If the EDC logic identifies a memory chip with errors, it initiates a correction process. This process involves using the parity information from the other memory chips to reconstruct the correct data for the faulty chip. This correction process can fix both single-bit and multiple-bit errors. Importantly, a system can continue operating without interruption, even during a memory error correction event. This is crucial in mission-critical environments where system downtime can have severe consequences. The correction process can happen in the background without affecting the system's performance. In some configurations, spare memory chips are available to replace a faulty one. If the correction process determines that a memory chip cannot be reliably restored, the system can activate a spare chip to maintain full memory capacity and performance.

Some systems require additional data protection during or after an EDC event. One conventional approach is a lock-step mode in which a single channel is reorganized into two adjacent memory channels. The channel lock-step mode is often combined with other error detection and correction techniques, such as error-correcting codes (ECC) for memory or hardware, to provide a higher level of reliability and fault tolerance. By employing redundancy and real-time comparison, the channel lock-step mode helps ensure that the system continues to operate correctly even in the presence of hardware failures or other unpredictable events. While the channel lock-step mode can improve the robustness of critical systems, it may come with some trade-offs, such as increased hardware complexity and potentially higher power consumption due to read and write operations with multiple channels.

It should be noted that metadata is any additional data associated with a block of data and may include EDC information symbols (ECC check symbols). However, as used herein for clarity, EDC information symbols will not be referred to as part of the metadata. Rather, the check symbols will be considered separate from the rest of the metadata. Examples of information conveyed/stored as metadata include host-controlled metadata (e.g., coherency data), device-controlled metadata (poison/valid flags for the cache line, memory authentication codes (e.g., Message Authentication Code (MAC)), Context-Key Identifier (CKID), or the like. It should also be noted that metadata associated with a block of data (e.g., cache line) can be stored "in-band" (also referred to as "in-line") and/or "side-band." The terms "side-band" and "in-band" relate to the location of metadata with respect to the location of the associated block of data. Side-band metadata is metadata stored alongside cache line data and accessed using the same address and possibly the same command. In-band metadata is stored at a different address than the block of data.

When a cache line has in-line metadata in the lock-step mode, the penalties double since the user data is read from two channels, followed by the metadata being read from two channels again. This results in four times the bandwidth and the power overhead.

Aspects and embodiments of the present disclosure address the above and other deficiencies by providing a memory sub-system with configurable in-line ADDDC. The memory sub-system has an in-line EDC configuration for ADDDC to replace the channel lock-step mode. The in-line ADDDC can outperform the channel lock-step mode in terms of bandwidth overhead. For example, the in-line ADDDC can outperform the channel lock-step mode by requiring 50% of the lock-step READ bandwidth in the case of user data without in-line metadata and 25% of READ bandwidth in the case of user data with in-line metadata. The in-line ADDDC requires 150% of WRITE bandwidth compared to the channel lock-step mode in the case of user data without in-line metadata, but requires only 75% of WRITE bandwidth in the case of user data with in-line metadata.

Aspects and embodiments of the present disclosure can be implemented in a Compute Express Link (CXL) buffer. The CXL buffer has a CXL controller that implements the CXL protocol. The CXL protocol can require the ability to provide 2 to 4 bits of metadata at cache line granularity for use by a central processing unit (CPU) when memory is shared with software coherency. Some CPUs can utilize an additional 16 bits of metadata for their Memory Tagging Extensions (MTE) capability to provide memory security. If in-line memory encryption (IME) with cryptographic integrity is utilized, a message authentication code (MAC) can be stored as metadata and verified, often in parallel with decryption. A MAC is data or information that is used to cryptographically authenticate an origin of data being sent from one entity to another. A MAC, also known as a tag, can protect a message's data integrity (also known as authenticity), allowing an entity having a key to verify authenticity of a message. In general, a MAC is intended to detect the manipulation of data by an adversary (referred to as an attack on memory). Depending on the configuration of the memory system, a variety of ECC options would be appropriate, each with different ECC error escape probabilities (e.g., four symbol detect and three symbols correct with ECC error escape probability of $5.4e^{-16}$ or three symbols correct with ECC error escape probability of $3.5e^{-11}$). ECC error escape probability is the probability that an error escapes ECC detection and correction.

FIG. 1 is a block diagram of an integrated circuit 102 with a memory controller 112, an error detection and correction (EDC) circuit 106, and a management processor 108 according to at least one embodiment. In at least one embodiment, the integrated circuit 102 is a memory buffer device that can communicate with one or more host systems (not illustrated in FIG. 1) using a cache-coherent interconnect protocol (e.g., the Compute Express Link™ (CXL™) protocol). The integrated circuit 102 includes a first interface 104 coupled to the one or more host systems or a fabric manager, a second interface 110 coupled to one or more volatile memory devices (not illustrated in FIG. 1), and an optional third interface 114 coupled to one or more non-volatile memory devices (not illustrated in FIG. 1). The one or more volatile memory devices can be DRAM devices. The integrated circuit 102 can be part of a single-host memory expansion integrated circuit, a multi-host memory pooling integrated circuit coupled to multiple host systems over multiple cache-coherent interconnects, or the like.

In one embodiment, the memory controller 112 receives data from a host over the first interface 104 or from a volatile memory device over the second interface 110. The memory controller 112 can send the data or a copy of the data to the EDC circuit 106. The EDC circuit 106 can include EDC logic that can autonomously detect errors in a region of memory and, upon detection of an error, calculate additional ECC check symbols for cache lines in the region and store the additional ECC check symbols as metadata associated with the affected cache lines. The additional ECC check symbols can be stored in the same cache line as the data they protect. The additional ECC check symbols can be stored in a different cache line from the data they protect.

In at least one embodiment, the EDC circuit 106 can receive an external command to calculate and store the additional ECC check symbols for the affected region. The external command can be received from a host device. Alternatively, another process that detects the EDC event can send the external command to the EDC circuit 106.

In at least one embodiment, the additional ECC check symbols can be used to correct errors during a read operation (READ) to the affected region. In at least one embodiment, the additional ECC check symbols can be recalculated during a write operation (WRITE, RMW) to the affected region. The EDC circuit 106 can be part of a remote memory module. The EDC circuit 106 can be a CXL buffer that implements the CXL technology. The memory controller 112 can be a CXL controller coupled to the EDC circuit 106. The CXL controller can be compliant with the CXL protocol.

In at least one embodiment, the EDC circuit 106 includes an ECC block and an in-line memory encryption (IME) block. The error can be detected and/or corrected by the ECC block. In the event that the error is caused by the faulty device, as described herein, the EDC circuit 106 can perform the operations described herein to provide double device error correction. The IME block can generate and/or use a message authentication code (MAC) in the received data. In at least one embodiment, the MAC verification can indicate an error that the ECC logic does not detect. The error detected by the MAC verification can be used to trigger the EDC circuit 106 to operate as described herein relative to an error detected by the ECC block. The EDC circuit 106 can send a notification of an EDC event to the host or fabric manager via the memory controller 112 or the management processor 108.

In another embodiment, the integrated circuit 102 can include an encryption circuit that can encrypt data being stored in the one or more volatile memory devices or one or more non-volatile memory devices coupled to the management processor 108 via a third interface 114. In another embodiment, the one or more non-volatile memory devices are coupled to a second memory controller of the integrated circuit 102.

In another embodiment, the integrated circuit 102 is a processor that implements the CXL™ standard and includes the EDC circuit 106 and memory controller 112. In another embodiment, the integrated circuit 102 can include more or fewer interfaces than three.

In at least one embodiment, the integrated circuit 102 can be a device that supports the CXL™ technology. The CXL™ protocol can be built upon physical and electrical interfaces of a PCI Express® standard with protocols that establish coherency, simplify the software stack, and maintain compatibility with existing standards. The integrated circuit 102 can include a CXL™ controller or a CXL™ memory expansion device (e.g., CXL™ memory expander System on Chip (SoC)) that is coupled to DRAM devices (e.g., one or more volatile memory devices) and/or persistent storage memory (e.g., one or more NVM devices). The CXL™ memory expansion device can include the management processor 108. The CXL™ memory expansion device can include the EDC circuit 106 to detect and correct errors in data read from memory or transferred between entities. The CXL™ memory expansion device can use an in-line memory encryption (IME) circuit to encrypt the host's unencrypted data before storing it in the DRAM device. The IME circuit can generate a message authentication code (MAC) that can be used to verify the encrypted data. In another embodiment, the integrated circuit 102 can include an error correction code (ECC) block or circuit that can generate or verify ECC information associated with the data. In another embodiment, one or more non-volatile memory devices are coupled to a second memory controller of the integrated circuit 102. In another embodiment, the integrated circuit 102 is a processor that implements the CXL™ standard and includes an in-line EDC logic and a memory controller 112.

In at least one embodiment, the integrated circuit 102 or EDC circuit 106 of FIG. 1 can perform configurable in-line ADDDC, as described in more detail below with respect to FIG. 3.

Figure 2:
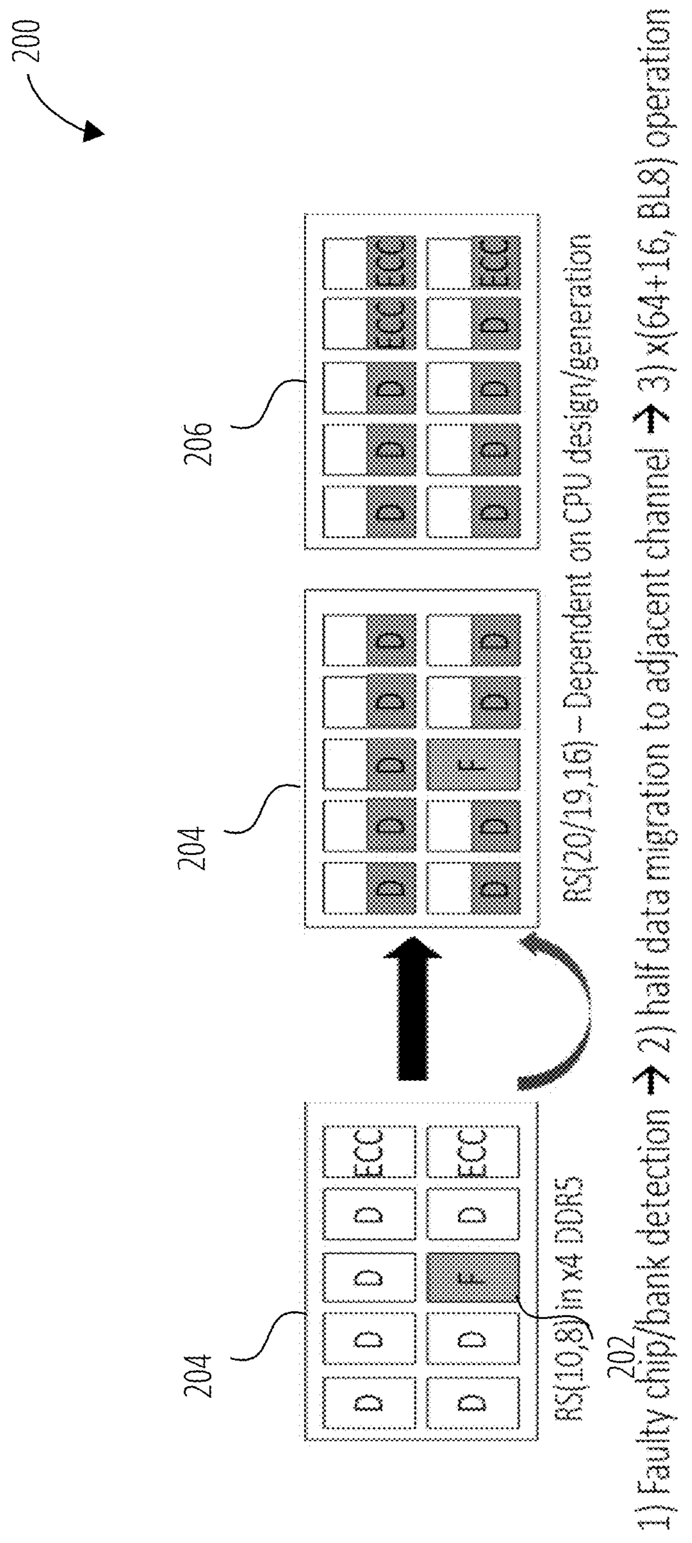
FIG. 2 illustrates an example of additional data protection during or after an error detection and correction (EDC) event using a lock-step mode according to at least one embodiment.

FIG. 2 illustrates an example of additional data protection during or after an EDC event using a lock-step mode 200 according to at least one embodiment. As described above, additional data protection during or after an EDC event is needed in some systems. In the lock-step mode 200, in response to an EDC event 202 (e.g., a faulty chip/bank event), a first memory channel 204 is reorganized into two memory channels, including the first memory channel 204 and a second memory channel 206. The two channels can be adjacent memory channels. In this example, the first memory channel 204 includes ten memory devices (e.g., x4 devices), where eight of the devices store data (labeled "D") and two of the devices store ECC check symbols (labeled "ECC"). For example, the first memory channel 204 can have a data path width of 32 bits with an additional 8 bits for ECC check symbols and a burst length of 16 data words per burst (x32+x8, BL16). This example can use Reed-Solomon (RS) coding (10,8) in x4 DDR5. After reorganizing the two data channels, the two memory channels together would have a data path width of 64 bits with an additional 16 bits for ECC check symbols. This would result in RS coding of (20, 16) or (19, 16) with a faulty device/bank or after erasing a faulty device/bank, respectively, in x4 DDR5. This allows correction of up to two x4 devices. This lock-step mode has penalties in both bandwidth and power overhead. For example, because DRAM has a burst length of 16 regardless of the lock-step mode, the lock-step mode requires two 64-byte read operations (2×64B READs) through two 32b channels to fetch a requested single 64-byte cache line, resulting in twice the bandwidth and twice the power overhead. The lock-step mode also requires two 64-byte write operations (2×64B WRITEs) with a Burst-Chop (BC) to avoid a read-modify-write (RMW) operation, resulting in twice the bandwidth and twice the power overhead.

Figure 3:
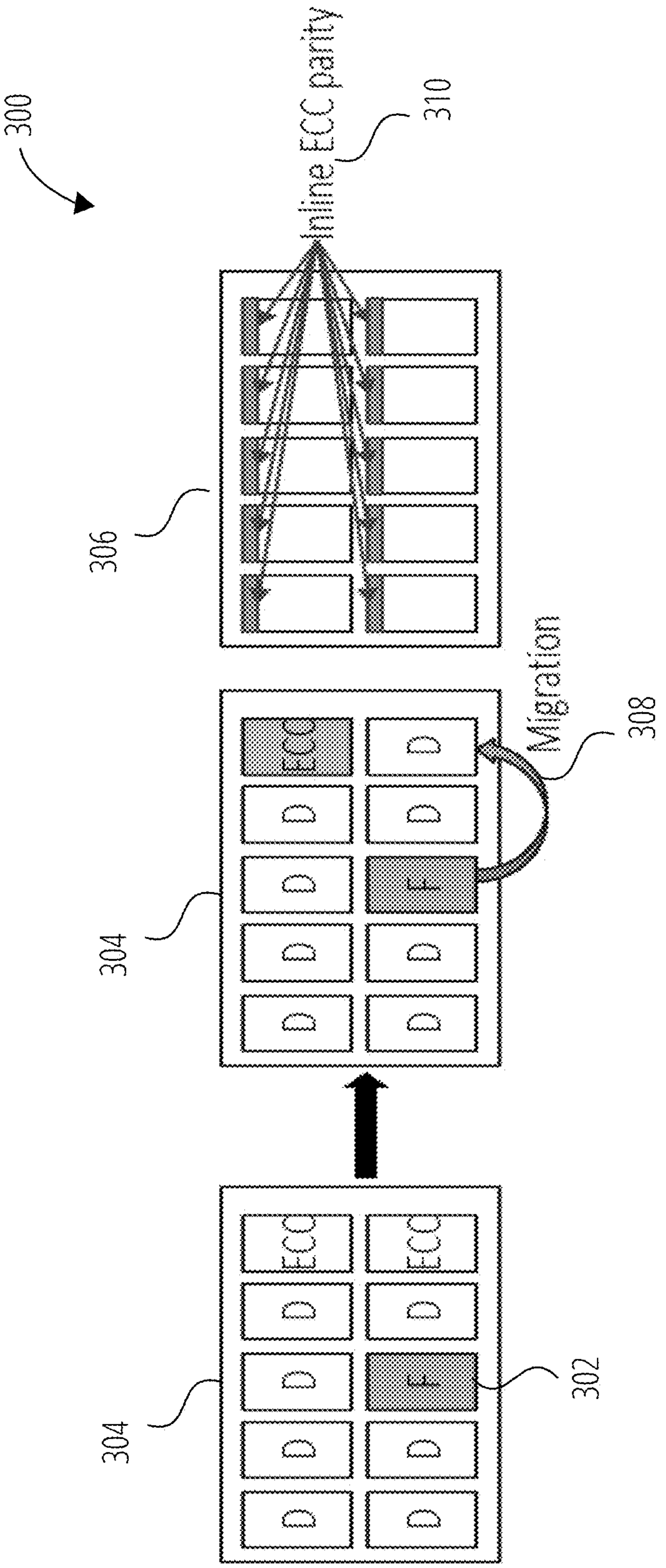
FIG. 3 illustrates an example of configurable in-line adaptive double device data correction (ADDDC) during or after an EDC event according to at least one embodiment.

FIG. 3 illustrates an example of configurable in-line ADDDC 300 during or after an EDC event according to at least one embodiment. In at least one embodiment, the configurable in-line ADDDC 300 can be performed by the integrated circuit 102 of FIG. 1 to provide additional data protection during or after an EDC event 302. In at least one embodiment, the configurable in-line ADDDC 300 can be performed by the EDC circuit 106 of FIG. 1 to provide additional data protection during or after an EDC event 302. In the configurable in-line ADDDC 300, in response to the EDC event 302 (e.g., faulty chip/bank event), data can be recovered from the faulty device in a first memory channel 304 and migrated 308 to another device in the same first memory channel 304. The EDC event 302 can occur when a faulty DRAM device is detected. The EDC event 302 can be a preemptive operation before the DRAM is faulty. The data in the faulty DRAM is migrated 308 to a properly functioning DRAM device in the same first memory channel 304. In configurable in-line ADDDC 300, extra ECC check symbols can be generated and stored as in-line metadata 310 (labeled Inline ECC parity) in a second memory channel 306 (or a different rank). In at least one embodiment, 8 bytes or more ECC parity bits or check symbols are saved to a different channel/rank to provide additional device data detection and correction (e.g., double Chipkill® protection). In at least one embodiment, no data is migrated after the detection of an error using the existing EDC. After the error, and based on the error detected, additional ECC check symbols can be calculated and stored in additional cache lines associated with the affected region for use in correcting the existing error and any future errors. This could be an alternative to requiring the migration, where essentially the existing ADC capability (e.g., Chipkill®) can be leveraged to correct the faulty chip and new ECC check symbols can be calculated and stored to protect against future additional failures. It should be noted that it is likely the ECC symbols before and after the detected error would be calculated differently, but by adding just ECC check symbols associated with a region of memory, a Chipkill® event can be sustained and the ability to sustain an additional Chipkill® event in the future can be set up.

In this example, the first memory channel 304 includes ten memory devices (e.g., x4 devices), where eight of the devices store data (labeled "D") and two of the devices store ECC check symbols (labeled "ECC"). After migration, the first memory channel 304 includes nine devices that store data (labeled "D"), and one device stores ECC check symbols (labeled "ECC"). For example, the first memory channel 304 can have a data path width of 32 bits with an additional 8 bits for ECC check symbols and a burst length of 16 data words per burst (x32+x8, BL16). This allows adaptive enabling of correction of a second (non-simultaneous) failing device, allowing correction of up to two x4 devices. More specifically, the redundant 8 DQ channels, used to construct RS (40,32) codewords, can be able to correct 4 random symbols in error in a single x4 device. Once it has been determined that a single device has failed, then one could A) correct via erasure decoding the failed symbols (and use the remaining 4 check symbols to correct up to two more symbols in error, or B) migrate the failed chip data to one of the sideband ECC devices and store (migrate) the evicted 4 ECC symbols as in-band data on the second memory channel 306. Now enough check symbols have been restored to correct a second device failure. This allows adaptive enabling of correcting a second (non-simultaneous) device failure.

After migration, the first memory channel 304 can still have a data path width of 36 bits with an additional 4 bits for some of the ECC check symbols. The second memory channel 306 can have ten memory devices (e.g., x4 devices), where all ten devices store ECC check symbols as in-line metadata 310. Unlike the lock-step mode 200, the configurable in-line ADDDC 300 does not have the same bandwidth and power overhead penalties. Since the additional ECC check symbols are stored as in-line metadata 310 in the second memory channel 306, a read operation to retrieve the in-line metadata 310 in the second memory channel 306 is only required after a detected error above a threshold is met to achieve additional ADDDC protection. Because the error rate is extremely small, only a single read operation (READ) is required to access the data in the first memory channel 304 in most cases. In the rare event that an error above the threshold is met, a second read operation (READ) may be needed to access the in-line metadata 310. In at least one embodiment, the ADDDC 300 can cover the scenario where the in-line metadata is read always (i.e., a threshold of zero). After the ADDDC 300 is in place, both cache lines can be read immediately.

Figure 4A:
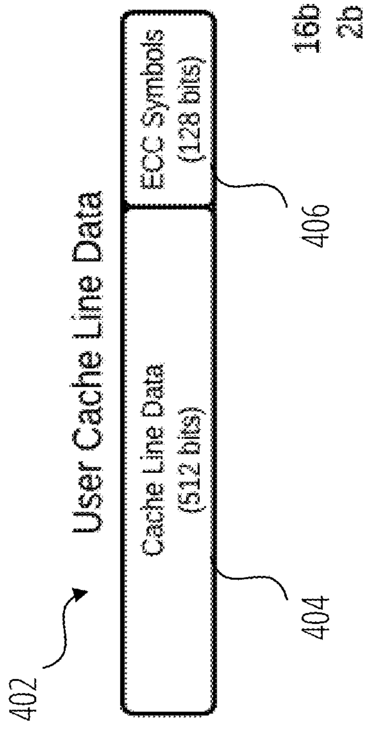
FIG. 4A illustrates a user cache line data with cache line data and ECC check symbols according to at least one embodiment.
Figure 4B:
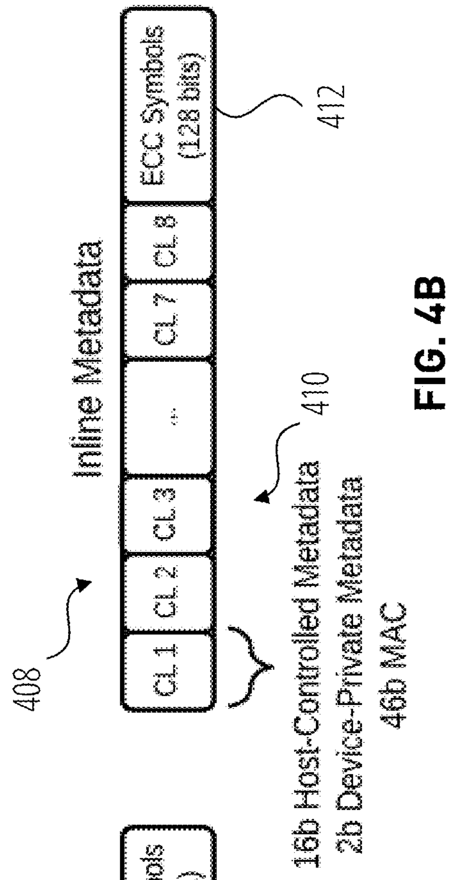
FIG. 4B illustrates in-line metadata with metadata and additional ECC check symbols according to at least one embodiment.

In at least one embodiment, the EDC circuit 106 can store metadata and EDC information symbols (e.g., EC (D) C) to a side-channel in the first memory channel 304, while storing EDC information symbols in-line in another cache line, as illustrated in FIG. 4A and FIG. 4B.

FIG. 4A illustrates a user cache line data 402 with cache line data 404 and ECC check symbols 406 according to at least one embodiment. The user cache line data 402 can be stored in a first cache line. The first cache line can have a first address.

FIG. 4B illustrates in-line metadata 408 with metadata 410 and additional ECC check symbols 412 according to at least one embodiment. In at least one embodiment, the metadata 410 can include host-controlled metadata, device-private metadata, a MAC, or the like. The metadata can also store counters, such as counters used to prevent replay attacks, as well as counters associated with the number of MAC verification failures. The in-line metadata 408 can be stored in a second cache line. The second cache line can have a second address that is different than the first address.

In summary, the lock-step mode protects against simultaneous double chip failures. The lock-step mode can be triggered by an EDC event (e.g., Chipkill® event) to protect against additional chip failures. In the lock-step mode, there are always reads and writes on two channels. In contrast, using the configurable in-line ADDDC, there is protection against simultaneous double chip failures. The in-line ADDDC can be triggered by an EDC event (e.g., Chipkill® event) to protect against additional chip failures. In the in-line ADDDC, there are always writes to two channels, but only reads from two channels if necessary (rarely). The in-line ADDDC can be configurable at a virtual machine (VM) allocation. The performance benefits between the two approaches are described in more detail below.

As described herein, the lock-step mode has bandwidth and power overhead penalties. For example, the lock-step mode requires two 64-byte read operations (2×64B READs) to fetch a single 64-byte cache line, resulting in twice the bandwidth and twice the power overhead. The lock-step mode also requires two 64-byte write operations (2×64B WRITEs) with a Burst-Chop (BC) to avoid a read-modify-write (RMW) operation, resulting in twice the bandwidth and twice the power overhead. When a cache line has in-line metadata in the lock-step mode, the penalties double since the user data is read from two channels, followed by the metadata being read from two channels again. This results in four times the bandwidth and the power overhead.

In comparison, in some embodiments, the ECC check symbols 406 (and/or MAC) in the side-band metadata of user cache line data 402 can detect and correct errors under a threshold value. The additional ECC check symbols 412 (in-line ECC symbols) can be read only when errors exceed the threshold to achieve ADDDC. Because the error rate can be extremely small, only a single read operation is required in most cases.

It should be noted for write operations, the bandwidth overhead can be increased: one write operation for data and one read-modify-write operation for metadata (e.g., 3×), as compared to 2× for the lock-step mode. Overall, under 2:1 of read-to-write ratio (R:W) access condition, the inline ECC configuration requires only 83% of bandwidth compared to lock-step mode. Note that 3× WRITE BW overhead can be reduced by using inline ECC coalescing. If memory device is configured to save metadata (e.g., MAC, Heap, . . . ), then the inline ECC scheme can reduce bandwidth requirement further. When in-line metadata is used, then the write bandwidth overhead becomes 75% of the lock-step mode. The bandwidth overhead comparisons are set forth in the following table, Table 1.

TABLE 1

| | Metadata Config. | | | |
|---|---|---|---|---|
| | No inline metadata | | Inline metadata for security (MAC/Heap/ . . . ) | |
| ADDC Config. | READ Overhead | WRITE overhead | READ Overhead | WRITE overhead |
| Lock-step mode | 2x | 2x | 4x | 4x |
| inline ECC | 1x | 3x | 1x | 3x |
| BW overhead[(1)] | 50% | 150% | 25% | 75% |

[(1)]BW overhead of inline ECC compared to the lock-step mode

As illustrated in Table 1, the configurable in-line ADDDC has reduced DRAM bandwidth and power overhead compared to the lock-step mode, especially when in-line metadata is already used. The configurable in-line ADDDC requires one read operation regardless of in-line metadata being used; and one write operation and one RMW operation regardless of in-line metadata being used. In contrast, the lock-step mode requires two read operations without in-line metadata and four read operations with in-line metadata; and two writes with in-line metadata and two writes and two RMW with in-line metadata.

In some embodiments, the configurable in-line ADDDC can provide ADDDC modality and selectively choose which blocks of memory utilize additional ECC check symbols for ADDDC protection. This can be reconfigurable by a hypervisor, an operating system, or the like. For example, the hypervisor or operating system can enable or disable in-line ADDDC as necessary for each region of memory. The configurable in-line ADDDC can provide programmatic control over memory reliability. The configurable in-line ADDDC can be implemented in a memory buffer device. The memory buffer device can autonomously detect errors in a region of memory and, upon detecting an error, calculate additional ECC check symbols for cache lines in the region. The memory buffer device can store the additional check symbols as metadata associated with the affected cache lines. In some embodiments, the additional check symbols are stored in the same cache line as the data they protect. In some embodiments, the additional check symbols are stored in a different cache line than the data they protect. In some embodiments, the memory buffer device can receive an external command to calculate and store additional check symbols for a region of memory. In some embodiments, the additional check symbols are used to correct errors during reads to the affected region. In some embodiments, the additional check symbols are recalculated during writes to the affected region. In some embodiments, the device is part of a remote memory module. In some embodiments, the device is a CXL buffer.

Figure 5:
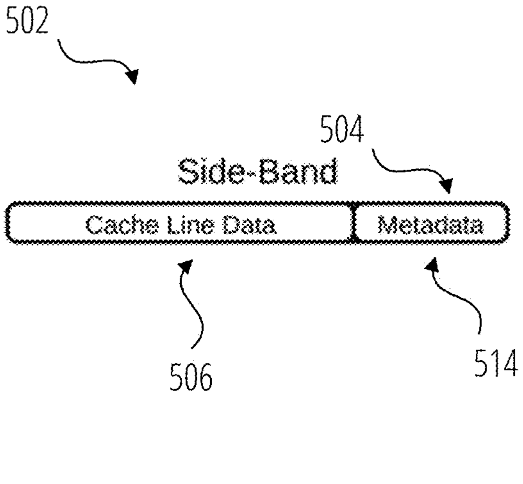
FIG. 5 illustrates a cache line in which a message authentication code (MAC) is stored and transferred in side-band metadata associated with cache line data and a cache line in which a MAC is stored and transferred in in-band metadata associated with cache line data, according to various embodiments.

As described herein, the additional ECC check symbols are stored in the same cache line as the data they are protecting (e.g., side-band) or in a different cache line as the data they are protecting (e.g., in-band), as illustrated in FIG. 5.

FIG. 5 illustrates a cache line 502 in which additional ECC check symbols 514 are stored and transferred in side-band metadata 504 associated with cache line data 506 and a cache line 508 in which additional ECC check symbols 514 are stored and transferred in in-band metadata 510 associated with cache line data 512, according to various embodiments. In general, the metadata includes host-controlled metadata, device-private metadata, a MAC, or the like, and the additional ECC check symbols 514. The metadata can be stored as side-band metadata 504 or in-band metadata 510. The side-band metadata 504 can be accessible when the cache line 502 is read from memory. The in-band metadata 510 can be stored in another location than the cache line data 512, such as in a static RAM (SRAM) or DRAM. When the cache line data 512 is read, an additional memory read would be performed to retrieve the in-band metadata 510, including the additional ECC check symbols 514. In some cases, the in-band metadata 510 only includes the additional ECC check symbols 514 and is only accessed when needed.

Figure 6:
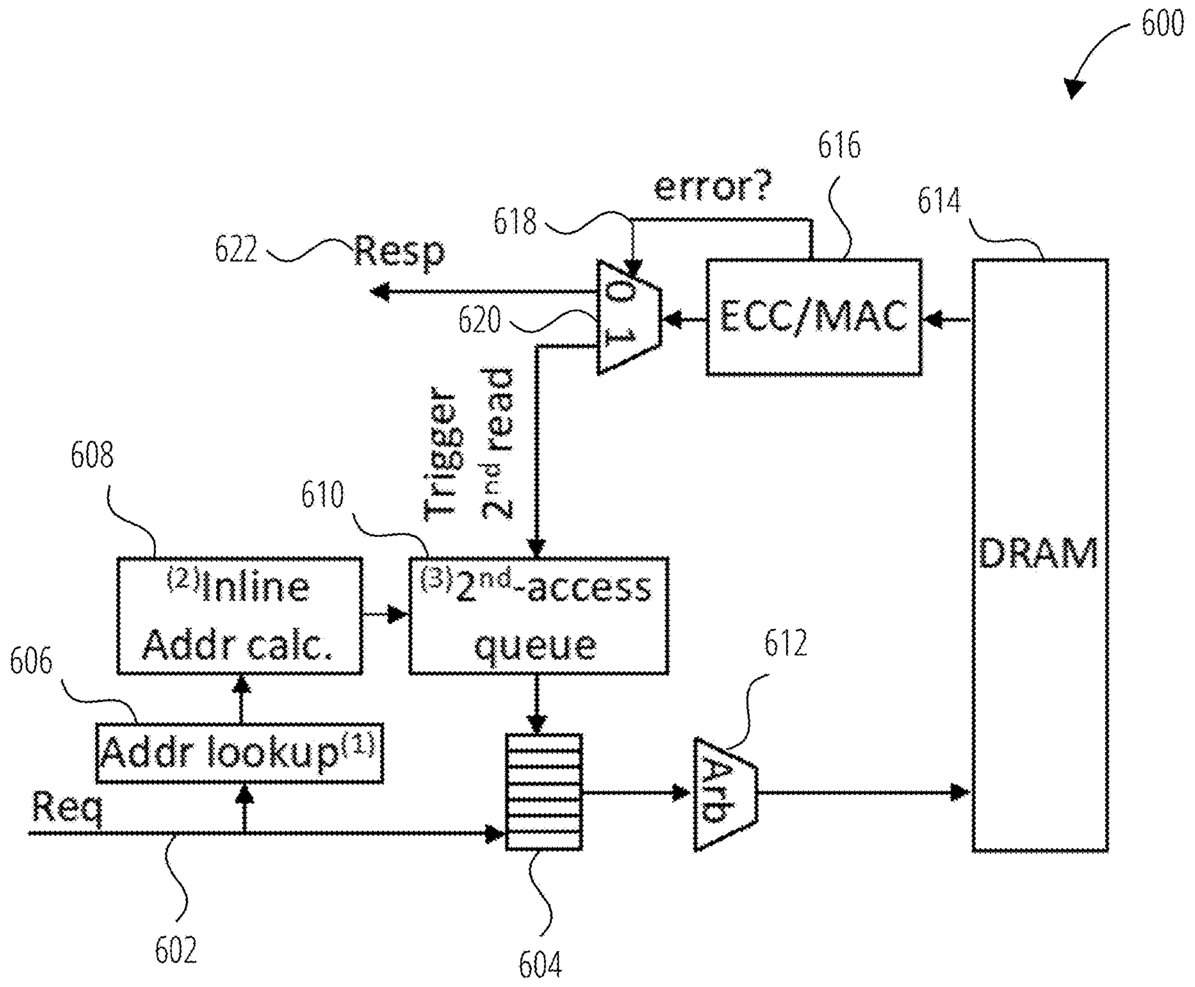
FIG. 6 illustrates an aspect of the subject matter in accordance with one embodiment.

FIG. 6 is a block diagram of EDC logic 600 in a read configuration according to at least one embodiment. The EDC logic 600 can receive a read request 602. The EDC logic 600 stores the read request 602 in a queue 604 to be arbitrated by an arbiter 612 (scheduler) before being sent to a DRAM device 614. An address lookup is performed for the read request 602 (block 606). The address lookup can be used when a fault-bank access is detected and for the ADDDC-capable address range. When the requested address has in-line ECC parity, the EDC logic 600 can calculate an in-line address (block 608). The in-line accesses can be saved to the queue 604. In some cases, the in-line access (second access) is saved into the queue 604 when triggered by the EDC logic 600. The EDC logic 600 can calculate the ECC/MC (block 616) for a read operation. According to the ECC/MAC results, the entry can be invalidated or sent to the arbiter 612 via the queue 604. For example, if an error 618 is detected in the ECC/MAC at block 616, it can control a multiplexer 620 that triggers a second read operation to be validated in the queue 604. If the error 618 is not detected at block 616, the multiplexer 620 can send a response 622. Similar operations can be done for a write operation. For a write operation, the EDC logic 600 can generate an RMW operation for an in-line ECC update operation. The RMW operation can be saved to the queue 604, and its access to the DRAM device 614 can be arbitrated by the arbiter 612.

Figure 7:
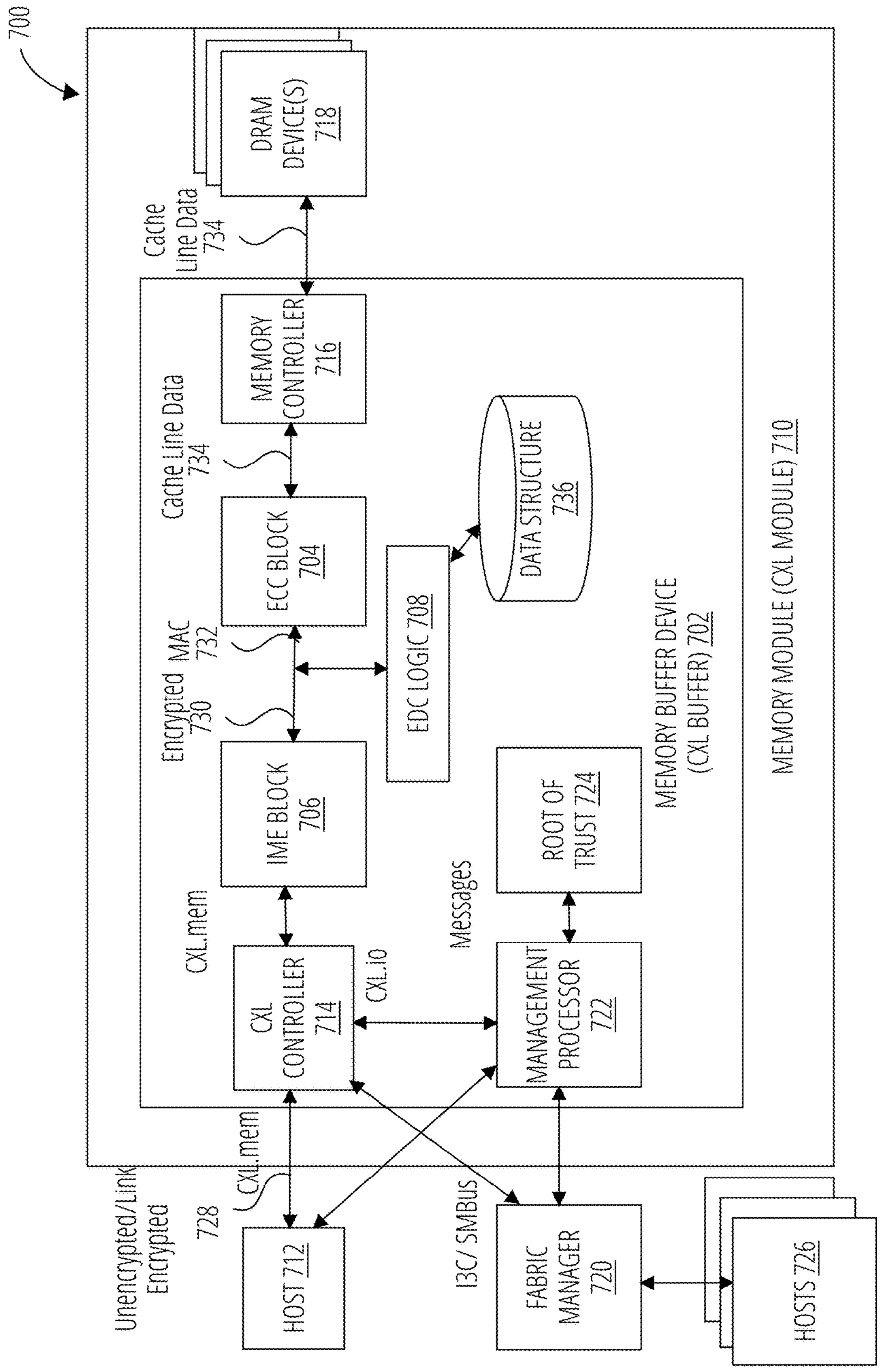
FIG. 7 is a block diagram of a memory system with a memory module with an in-line memory encryption (IME) block and EDC logic for providing additional data protection after detecting an error according to at least one embodiment.

FIG. 7 is a block diagram of a memory system 700 with a memory module 710 with an IME block 706 and EDC logic 708 for providing additional data protection after detecting an error according to at least one embodiment. In one embodiment, the memory module 710 includes a memory buffer device 702 and one or more DRAM device(s) 718. In at least one embodiment, the one or more DRAM devices 718 can be disposed on more than one channel, controlled by more than one memory controller. In at least one embodiment, a single controller can handle in-band storage of the migrated/reformatted cache line ECC check symbols, with additional controllers to access the user data protected by the ECC symbols. In this case, the cache line and ECC metadata can be retrieved in parallel. In one embodiment, the memory buffer device 702 is coupled to one or more DRAM device(s) 718 and a host 712. In another embodiment, the memory buffer device 702 is coupled to a fabric manager 720 that is operatively coupled to one or more hosts 726. In another embodiment, the memory buffer device 702 is coupled to both the host 712 and the fabric manager 720. A fabric manager is software executed by a device, such as a network device or switch, that manages connections between multiple entities in a network fabric. The network fabric is a network topology in which components pass data to each other through interconnecting switches. A network fabric between devices can include hubs, switches, adapter endpoints, etc.

In one embodiment, the memory buffer device 702 includes an error correction code (ECC) block 704 (e.g., ECC circuit) to detect and correct errors in cache lines being read from a DRAM device(s) 718 and an IME block 706 to generate a message authentication code (MAC) for each cache line to provide cryptographic integrity on accesses to the respective cache line. The memory buffer device 702 also includes EDC logic 708 coupled to the ECC block 704 and the IME block 706. The EDC logic 708 can provide additional protection during or after an EDC event detected by the ECC block 704 (or a MAC check by the IME block). The EDC logic 708 can detect that a first memory device of the plurality of memory devices has a fault or is corrupt. The EDC logic 708 can migrate data previously stored in the first memory device to a second memory device of the plurality of memory devices. For example, the EDC logic 708 can cause a memory controller to migrate the data previously stored in the first memory device to a second memory device. The first memory device and the second memory device can be part of a first memory channel or a first rank. The EDC logic 708 can store additional check symbols as metadata in a second memory channel or a second rank to provide data protection to data in the first memory channel. The second memory channel is different from the first memory channel, and the second rank is different from the first rank. The second memory channel is different to ensure that the cache line data, metadata, and ECC check symbols have been migrated to an independent fault domain (i.e., a separate failure domain). That is, the metadata containing the newly calculated extra ECC check symbols should be in the separate failure domain to reduce the number of symbols required to be stored. The EDC logic 708 can cause the memory controller to store the additional check symbols as metadata in the second memory channel or second rank. In at least one embodiment, a first memory controller can migrate the data previously stored in the first memory device to the second memory device, and a second memory controller can store the additional check symbols as metadata in the second memory channel or second rank. The second memory controller can write and subsequently read the additional check symbols to and from the second memory channel. If the check symbols necessary to achieve ADDDC are stored as in-band metadata on the same channel, such as in a different rank or a different bank), then only a single memory controller could be used.

In at least one embodiment, the data in the second memory device is stored in a first cache line, and the EDC logic 708 can store the additional check symbols as in-line metadata in a second cache line different from the first cache line. In at least one embodiment, the data in the second memory device is stored in a first cache line, and the EDC logic 708 can store a first portion of the additional check symbols as side-band metadata in a side-channel of the first memory channel and a second portion of the additional check symbols as in-line metadata in a second cache line different from the first cache line.

In another embodiment, the ECC block 704 can detect and correct errors in cache lines being read from or written to a DRAM device. The EDC logic 708 is coupled to the ECC block 704. The EDC logic 708 can detect an error, corrected by the ECC block, in a cache line using ECC data in the cache line. The cache line is part of a first memory channel. The EDC logic 708 can migrate data from a first memory device that caused the error to a second memory device in the first memory channel. Alternatively, additional check symbols can be calculated and migration can be avoided. The EDC logic 708 can store additional check symbols as metadata in a second memory channel to provide data protection to data in the first memory channel after detecting the error. The second memory channel is different from the first memory channel. In at least one embodiment, the EDC logic 708 and the ECC block 704 can be merged into one block. That is, the EDC logic 708 can be part of the ECC block 704. In another embodiment, the EDC logic 708 can be part of a memory controller. In another embodiment, the EDC logic 708, the ECC block 704, and/or IME block can be implemented in a memory controller.

In a further embodiment, the memory buffer device 702 includes a CXL controller 714 and a memory controller 716. The CXL controller 714 is coupled to host 712 or multiple hosts 726 via the fabric manager 720. The memory controller 716 is coupled to the one or more DRAM devices 718. In a further embodiment, the memory buffer device 702 includes a management processor 722 and a root of trust 724. In at least one embodiment, the management processor 722 receives one or more management commands through a command interface between the host 712 (or fabric manager 720) and the management processor 722. In at least one embodiment, the memory buffer device 702 is implemented in a memory expansion device, such as a CXL memory expander SoC of a CXL NVM module or a CXL module. The memory buffer device 702 can encrypt unencrypted data 728 (e.g., plain text or cleartext user data), received from a host 712, using the IME block 706 to obtain encrypted data 730 before storing the encrypted data 730 in DRAM device (s) 718. In some cases, the IME block 706 can receive data that is encrypted for transmission across the link. The IME block 706 can generate additional ECC check symbols associated with the encrypted data 730. In at least one embodiment, the IME block 706 is an IME engine. In another embodiment, the IME block 706 is an encryption circuit or encryption logic. The ECC block 704 can receive the encrypted data 730 from the IME block 706. The ECC block 704 can generate ECC information associated with the encrypted data 730. The encrypted data 730, the additional ECC check symbols, and the ECC information can be organized as cache line data 734. The memory controller 716 can receive the cache line data 734 from the ECC block 704 and store the cache line data 734 in the DRAM device(s) 718. It should be noted that the memory buffer device 702 can receive unencrypted data, but can also receive data that is encrypted as it traverses a link (e.g., the CXL link). This encryption is usually a link encryption, generally referred to in CXL as integrity and data encryption. The link encryption in this case would not persist to DRAM as the CXL controller 714 in the memory module 710 can decrypt the link data and verify its integrity prior to the flow described herein where the IME block 706 encrypts the data and generates the additional ECC check symbols. Although "unencrypted data 728" is used herein, in other embodiments, the data can be encrypted data that is encrypted by the memory buffer device 702 using a key only used for the link and thus cleartext data exists within the SoC after the CXL controller 714 and thus needs to be encrypted by the IME block 706 to provide encryption for data at rest. In other embodiments, the IME block 706 does not encrypt the data but still can generate the additional ECC check symbols.

In at least one embodiment, the CXL controller 714 includes two interfaces: a host memory interface (e.g., CXL.mem) and a management interface (e.g., CLX io). The host memory interface can receive, from the host 712, one or more memory access commands of a remote memory protocol, such as Compute Express Link (CXL) protocol, Gen-Z, Open Memory Interface (OMI), Open Coherent Accelerator Processor Interface (OpenCAPI), or the like. The management interface can receive, from the host 712 or the fabric manager 720 by way of the management processor 722, one or more management commands of the remote memory protocol.

In at least one embodiment, the IME block 706 receives a data stream from a host 712 and encrypts the data stream into the encrypted data 730, and provides the encrypted data 730 to the ECC block 704 and the memory controller 716. The memory controller 716 stores the encrypted data 730 in the DRAM device(s) 718 along with the additional ECC check symbols and the ECC information as the cache line data 734.

During operation, the EDC logic 708 is to track historical ECC corrected errors at cache line granularity or page granularity. In at least one embodiment, the EDC logic 708, responsive to an error being detected, writes a pattern to a cache line, and reads the pattern from the cache line to test the cache line for a second error. In at least one embodiment, a match of the pattern indicates that the error is caused by an attack on the memory or more likely caused by the attack than an error caused by an ECC escape. If a second error is detected, the error is likely caused by an ECC escape or more likely that it is caused by the ECC escape than an attack on the memory.

In another embodiment, the EDC logic 708, responsive to an error being detected, migrates the cache line from a first physical location to a second physical location for subsequent monitoring. A subsequent error that is uncorrected by the ECC block 704 tends to indicate that the error is caused by an attack on the memory. In at least one embodiment, the migration of the cache line from the first physical location to the second physical location does not change an address used by a connected host 712.

In another embodiment, the EDC logic 708, responsive to an error being detected, rearranges cache lines of the DRAM device(s) 718 for subsequent monitoring. A subsequent error that is uncorrected by the ECC block 704 tends to indicate that the error is caused by an attack on the memory. In at least one embodiment, the rearrangement of the cache lines does not change addresses used by a connected host 712.

In one embodiment, the memory buffer device 702 can include a data structure 736 associated with the EDC logic 708. The data structure 736 stores information about historical MAC verification failures over time, historical ECC corrected errors over time, or both. In at least one embodiment, the information identifies an address of the cache line, a timestamp of the error, and an error type. The information can include additional details. In at least one embodiment, the data structure 736 is a first-in-first-out (FIFO) buffer that stores a last N number of the historical MAC verification failures, where N is a positive integer greater than zero. The EDC logic 708 can query the FIFO buffer responsive to the error being detected in the cache line. The data structure 736 can store the information at a cache line granularity or a page granularity.

In at least one embodiment, the EDC logic 708 can write first data to the cache line, where the first data is a known pattern or is known by the memory buffer device 702. The EDC logic 708 reads second data from the cache line and determines whether the second data and the first data match. The EDC logic 708 determines the error as having been caused by the attack on the cache line responsive to the first data and the second data matching. In at least one embodiment, the data structure 736 can track a number of corrections to the cache line. In another embodiment, the EDC logic 708 can track a number of corrections to the cache line as a value in the cache line.

In some embodiments, the memory module 710 has persistent memory backup capabilities where the management processor 722 can access the encrypted data 730 and transfer the encrypted data from the DRAM device(s) 718 to persistent memory (not illustrated in FIG. 7) in the event of a power-down event or a power-loss event. The encrypted data 730 in the persistent memory is considered data at rest. In at least one embodiment, the management processor 722 transfers the encrypted data to the persistent memory using an NVM controller (e.g., NAND controller).

The IME block 706 can include multiple encryption functions, such as a first encryption function that uses 256-AES encryption and a second encryption function that uses 512-AES encryption. In other embodiments, the encryption functions can also provide cryptographic integrity, such as using a message authentication code (MAC). In other embodiments, the cryptographic integrity can be provided separately from the encryption function. In some cases, the strength of the MAC and encryption algorithms can be different. The first encryption function can have a first encryption strength, such as 256-AES encryption. In at least one embodiment, the IME block 706 is an IME engine with two encryption functions. In another embodiment, the IME block 706 includes two separate IME engines, each having one of the two encryption functions. In another embodiment, the IME block 706 includes a first encryption circuit for the first encryption function and a second encryption circuit for the second encryption function. Alternatively, additional encryption functions can be implemented in the IME block 706. The memory controller 716 can receive the encrypted data 730 from the IME block 706 and store the encrypted data 730 in the DRAM device(s) 718 from the IME block 706.

In at least one embodiment, the MAC can be calculated on a first encrypted data stored with a second encrypted data as part of the algorithm (e.g., AES) or separately with a different algorithm. The memory controller 716 can receive the encrypted data 730 and additional ECC check symbols from the IME block 706 and store the encrypted data 730 and additional ECC check symbols in the DRAM device(s) 718. The host-to-unencrypted memory path can bypass the IME block 706 for all host transactions. The host-to-unencrypted memory path can still pass through the IME block 706 for generating the additional ECC check symbols. In at least one embodiment, the encryption can be serialized (e.g., a first time for memory (DRAM) storage and a second time with a second standard for persistent storage. As described herein, the keys can be stored in persistent memory storage. The persistent memory storage can be used to securely store and restore the encrypted contents of the DRAM to a previous state that can be accessed by the host and restore the keys necessary to decrypt this data.

In at least one embodiment, the additional ECC check symbols can be stored and transferred as metadata in connection with cache line data. The metadata can include a first portion with ECC information and a second portion with the additional ECC check symbols. In at least one embodiment, the metadata can be 32 bits, with 27 bits used for the additional ECC check symbols. In another embodiment, the metadata can be 16 bits with 11 bits for the additional ECC check symbols. The number of bits of the metadata can vary between the ECC information and the additional ECC check symbols. In another embodiment, the metadata can include only the additional EDC check symbols. The metadata can be stored and transferred in side-band metadata or in-band metadata, as illustrated and described below with respect to FIG. 5.

In at least one embodiment, a memory buffer device includes an ECC block (or ECC circuit) and EDC logic (EDC circuit or EDC block). The ECC block can detect and correct errors in cache lines being read from or written to a DRAM device. The EDC logic can detect an error, corrected by the ECC block, in a cache line using ECC data in the cache line. The cache line is part of a first memory channel. The EDC logic can migrate data from a first memory device that caused the error to a second memory device in the first memory channel. The EDC logic can store additional check symbols as metadata in a second memory channel to provide data protection to data in the first memory channel after detecting the error. The second memory channel is different from the first memory channel. In a further embodiment, the memory buffer device can include an IME block to generate an MAC for each cache line. The memory buffer device can include a CXL controller coupled to the IME block and one or more hosts or a fabric manager, a memory controller coupled to the ECC block and the DRAM device, and a management processor coupled to the CXL controller. In at least one embodiment, an SoC includes the IME circuit, the ECC block, the EDC logic, the CXL controller, the memory controller, and the management processor. In other embodiments, multiple integrated circuits can be used.

In a further embodiment, a system includes a memory device (e.g., a DRAM device) and a memory controller coupled to the memory device via a channel. The memory controller includes EDC logic. The controller can be compliant with the CXL protocol. The EDC logic can detect an error in a cache line using EDC information symbols in the cache line. The cache line is part of a first memory channel. The EDC logic can migrate data from a first memory device that caused the error to a second memory device in the first memory channel. The EDC logic can store additional EDC information symbols as metadata to provide data protection to data in the first memory channel after detecting the error. The additional EDC information symbols can be used to correct errors during a read operation. The EDC logic can recalculate the additional EDC information symbols during a write operation. The EDC logic can store at least a portion of the additional EDC information symbols in the same cache line in the first memory channel. The metadata can be in-line metadata. The EDC logic can store at least a portion of the additional EDC information symbols in a second memory channel, the second memory channel being different from the first memory channel.

In at least one embodiment, a memory module can support a remote memory protocol. The memory module can include one or more volatile memory devices, an encryption circuit, an ECC circuit, and EDC logic. The encryption circuit can generate a MAC to be stored with each cache line and verify the MAC when accessing of the respective cache line. The ECC circuit can generate ECC information to be stored with each cache line. The ECC circuit can detect up to a first specified number of errors in a cache line and correct up to a second specified number of errors in the cache line using the ECC information. The EDC logic can detect an error in a cache line using the ECC information in the cache line, wherein the cache line is part of a first memory channel. The EDC logic can migrate data from a first memory device that caused the error to a second memory device in the first memory channel. The EDC logic can cause a memory controller to migrate the data from the first memory device to the second memory device. The EDC logic can generate additional ECC information as metadata to provide data protection to data in the first memory channel after detecting the error. The EDC logic can store additional ECC information as metadata in a second memory channel. The second memory channel is different from the first memory channel. The EDC logic can cause the memory controller (or a second memory controller) to store (and subsequently read) the additional ECC information as metadata in the second memory channel.

Figure 8:
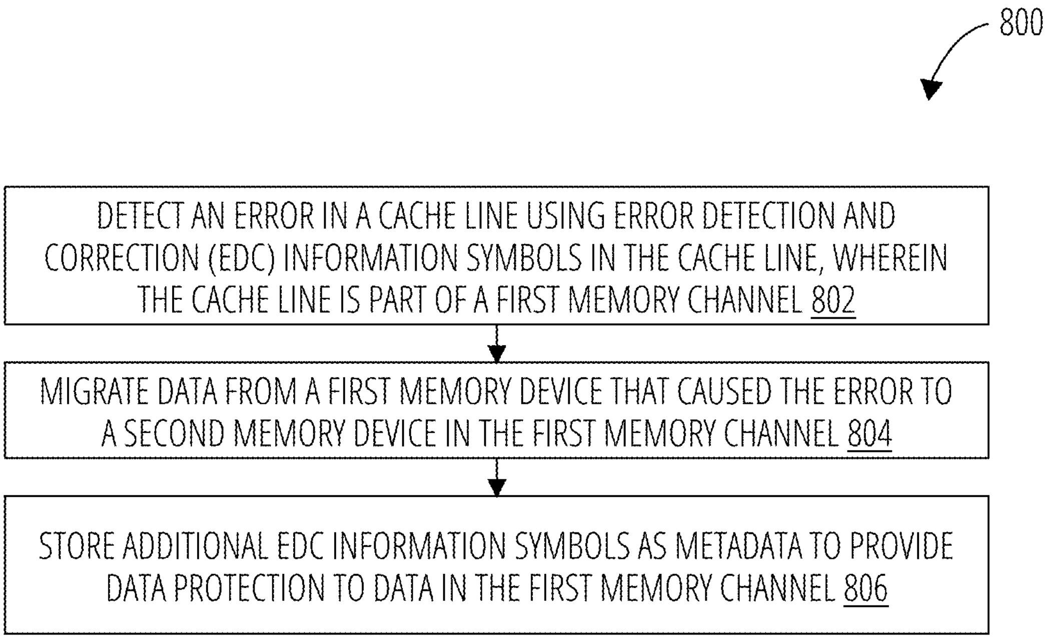
FIG. 8 is a flow diagram of a method for storing additional EDC information symbols to provide additional data protection after detecting an error according to at least one embodiment.

FIG. 8 is a flow diagram of a method 800 for storing additional EDC information symbols to provide additional data protection after detecting an error according to at least one embodiment. The method 800 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 800 is performed by any of the hardware described above with respect to FIG. 1 to FIG. 7. In one embodiment, the method 800 is performed by the integrated circuit 102 or EDC circuit 106 of FIG. 1, a memory buffer device, a memory expansion device, a memory module 710 of FIG. 7, an integrated circuit having the EDC logic or EDC circuit, as described herein.

Referring to FIG. 8, the method 800 begins with the processing logic detecting an error in a cache line using EDC information symbols in the cache line (block 802). The cache line can be part of a first memory channel. At block 804, the processing logic migrates data from a first memory device that caused the error to a second memory device in the first memory channel. At block 806, the processing logic stores additional EDC information symbols as metadata to provide data protection to data in the first memory channel. The processing logic can perform other operations as described above with respect to FIG. 1 to FIG. 7.

In at least one embodiment, the operation at block 804 is optional. As noted herein, the migration at block 804 can improve performance, but can be skipped. The number of ECC check symbols calculated after a detected error can be different if the data is migrated from the faulty chip or not.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

Typically, such "fragile" data is delivered sequentially from the data source to each of its destinations. The transfer can include transmitting or delivering the data from the source to a single destination and waiting for an acknowledgment. Once the acknowledgment has been received, the source then commences the delivery of data to the next destination. The time required to complete all the transfers can potentially exceed the lifespan of the delivered data if there are many destinations or there is a delay in reception for one or more transfer acknowledgments. This has traditionally been addressed by introducing multiple timeouts/retry timers and complicated scheduling logic to ensure timely completion of all the transfers and identify anomalous behavior.

In at least one embodiment, the situation can be improved by either broadcasting the data to all the destinations at once, like a multi-cast transmission in Ethernet. This can decouple the data delivery and acknowledgment without delaying the delivery of data by a previous destination's delivery acknowledgment. These approaches can provide some following benefits, as well as others. Broadcasting the data to all destinations at once can remove any limit to the number of destinations that can be supported. The control logic can be simplified. For example, there can be a single time to track the lifespan of data and a single register to track delivery acknowledgment reception. In one embodiment, an incomplete delivery is simply indicated by the register not being fully populated by 1's (or 0's if the convention is reversed) at the end of the data timeout period.

It is to be understood that the above description is intended to be illustrative and not restrictive. Many other implementations will be apparent to those of skill in the art upon reading and understanding the above description. Therefore, the disclosure scope should be determined with reference to the appended claims, along with the full scope of equivalents to which such claims are entitled.

In the above description, numerous details are set forth. It will be apparent, however, to one skilled in the art that the aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be noted that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A memory buffer device comprising:

error detection and correction (EDC) circuitry configured to autonomously detect errors in a region of memory using initial check symbols, and upon detection of an error, calculate additional check symbols for cache lines in the region, wherein the additional check symbols are different from the initial check symbols, and store the additional check symbols as metadata associated with the cache lines.

2. The memory buffer device of claim 1, wherein the additional check symbols are stored in the same cache line as data they are protecting.

3. The memory buffer device of claim 1, wherein the additional check symbols are stored in a different cache line than data they are protecting.

4. The memory buffer device of claim 1, wherein the EDC circuitry is to receive a command to calculate and store the additional check symbols for the region.

5. The memory buffer device of claim 1, wherein the additional check symbols are used to correct errors during a read operation to the region.

6. The memory buffer device of claim 1, wherein the additional check symbols are recalculated during a write operation to the region.

7. The memory buffer device of claim 1, wherein the memory buffer device is part of a remote memory module.

8. The memory buffer device of claim 1, wherein the memory buffer device comprises a controller compliant with the Compute Express Link (CXL) protocol.

9. An integrated circuit comprising:

a first interface coupled to one or more host devices;

a second interface coupled to a plurality of memory devices;

a memory controller operatively coupled to the first interface and the second interface; and an error detection and correction (EDC) circuit coupled to or part of the memory controller, wherein the EDC circuit is to:

detect that a first memory device of the plurality of memory devices has a fault or is corrupt;

cause the memory controller to migrate data previously stored in the first memory device to a second memory device of the plurality of memory devices, wherein the first memory device and the second memory device are part of a first memory channel or a first rank; and store additional check symbols as metadata in a second memory channel or a second rank to provide data protection to data in the first memory channel, wherein the second memory channel is different from the first memory channel and the second rank is different from the first rank.

10. The integrated circuit of claim 9, wherein the data in the second memory device is stored in a first cache line, and wherein the EDC circuit is to store the additional check symbols as in-line metadata in a second cache line different from the first cache line.

11. The integrated circuit of claim 9, wherein the data in the second memory device is stored in a first cache line, and wherein the EDC circuit is to store a first portion of the additional check symbols as side-band metadata in a side-channel of the first memory channel and a second portion of the additional check symbols as in-line metadata in a second cache line different from the first cache line.

12. A system comprising:

a memory device; and a memory controller coupled to the memory device via a channel, wherein the memory controller comprises an error detection and correction (EDC) logic to:

detect an error in a cache line using EDC information symbols in the cache line, wherein the cache line is part of a first memory channel;

migrate data from a first memory device that caused the error to a second memory device in the first memory channel; and store additional EDC information symbols as metadata to provide data protection to the data in the first memory channel after detecting the error.

13. The system of claim 12, wherein the memory device is a dynamic random-access memory (DRAM) device.

14. The system of claim 12, wherein the additional EDC information symbols are used to correct errors during a read operation.

15. The system of claim 12, wherein the EDC logic is to recalculate the additional EDC information symbols during a write operation.

16. The system of claim 12, wherein the EDC logic is to store at least a portion of the additional EDC information symbols in the same cache line in the first memory channel.

17. The system of claim 12, wherein the metadata is in-line metadata, and wherein the EDC logic is to store at least a portion of the additional EDC information symbols in a second memory channel, wherein the second memory channel is different from the first memory channel.

18. The system of claim 12, further comprising a second memory controller, wherein the memory controller is to migrate the data from the first memory device to the second memory device, and wherein the second memory controller is to store the additional EDC information symbols in a second memory channel.

19. The system of claim 12, further comprising a System on Chip (SoC) comprising an in-line memory encryption (IME) block, an error correction code (ECC) block, the EDC logic, and a controller compliant with the Compute Express Link (CXL) protocol, the memory controller, and a management processor.

20. The system of claim 12, further comprising an error correction code (ECC) block, wherein the EDC logic is part of the ECC block.

* * * * *